(12) United States Patent
Zhou et al.

(10) Patent No.: US 12,065,054 B2
(45) Date of Patent: Aug. 20, 2024

(54) ELECTRIC VEHICLE CHARGING SCHEDULING METHOD AND SYSTEM BASED ON CLOUD-EDGE COLLABORATION

(71) Applicant: Hefei University of Technology, Anhui (CN)

(72) Inventors: Kaile Zhou, Anhui (CN); Dingding Hu, Anhui (CN); Lanlan Li, Anhui (CN); Xinhui Lu, Anhui (CN); Zhineng Fei, Anhui (CN)

(73) Assignee: Hefei University of Technology, Hefei (CN)

( * ) Notice: Subject to any disclaimer, the term of this patent is extended or adjusted under 35 U.S.C. 154(b) by 518 days.

(21) Appl. No.: 17/490,145

(22) Filed: Sep. 30, 2021

(65) Prior Publication Data
US 2022/0024338 A1      Jan. 27, 2022

(30) Foreign Application Priority Data

Jul. 28, 2021  (CN) .......................... 202110858558.3

(51) Int. Cl.
*B60L 53/63* (2019.01)
*B60L 53/66* (2019.01)
*G06N 20/00* (2019.01)

(52) U.S. Cl.
CPC ............... *B60L 53/63* (2019.02); *B60L 53/66* (2019.02); *G06N 20/00* (2019.01)

(58) Field of Classification Search
None
See application file for complete search history.

(56) References Cited

U.S. PATENT DOCUMENTS

2017/0337646 A1* 11/2017 Zhou ...................... B60L 58/12

FOREIGN PATENT DOCUMENTS

| CN | 110957752 A |   | 4/2020  |
|----|-------------|---|---------|
| CN | 111555370 A |   | 8/2020  |
| CN | 112134272 A |   | 12/2020 |
| CN | 112949898 A | * | 6/2021  |

* cited by examiner

*Primary Examiner* — David V Henze-Gongola

(57) ABSTRACT

The invention provided an electric vehicle charging scheduling method, apparatus and system based on cloud-edge collaboration, a storage medium and an electronic device. In the present invention, a charging request of an electric vehicle user is accepted and processed by an edge computing unit, and a target charging station for a to-be-charged electric vehicle is determined with a minimum traveling cost as a target, so that a data transmission distance is reduced, and the electric vehicle user is timely assisted in selecting the target charging station and completing a charging appointment. After the charging appointment is made, charging data is uploaded to a charging optimization scheduling model pre-trained by a cloud platform for obtaining an electric vehicle charging scheduling strategy, so that powerful cloud platform computing abilities and rapid response advantages of the edge computing unit are fully utilized, the problem of network congestion is avoided, and timeliness is improved.

20 Claims, 3 Drawing Sheets

Determining a target charging station for a to-be-charged electric vehicle with a minimum traveling cost as a target according to a charging request and charging station information — s1

After the to-be-charged electric vehicle establishes a charging appointment with the target charging station, uploading electric vehicle charging data in the subinterval served by each edge computing unit to a charging optimization scheduling model pre-trained by a cloud platform, wherein the charging optimization scheduling model is established by the cloud platform based on a current basic load prediction result — s2

Receiving an electric vehicle charging scheduling strategy obtained by the cloud platform which solves the charging optimization scheduling model based on a particle swarm algorithm, and issuing a scheduling instruction to each charging station according to the scheduling strategy, to realize orderly charging of electric vehicles in an entire charging region — s3

Determining a target charging station for a to-be-charged electric vehicle with a minimum traveling cost as a target according to a charging request and charging station information ⸺ s1

After the to-be-charged electric vehicle establishes a charging appointment with the target charging station, uploading electric vehicle charging data in the subinterval served by each edge computing unit to a charging optimization scheduling model pre-trained by a cloud platform, wherein the charging optimization scheduling model is established by the cloud platform based on a current basic load prediction result ⸺ s2

Receiving an electric vehicle charging scheduling strategy obtained by the cloud platform which solves the charging optimization scheduling model based on a particle swarm algorithm, and issuing a scheduling instruction to each charging station according to the scheduling strategy, to realize orderly charging of electric vehicles in an entire charging region ⸺ s3

Fig. 1

ELECTRIC VEHICLE CHARGING SCHEDULING METHOD AND SYSTEM BASED ON CLOUD-EDGE COLLABORATION

CROSS-REFERENCE TO RELATED APPLICATIONS

This application claims the benefit of priority from Chinese Patent Application No. 202110858558.3, filed on Jul. 28, 2021. The content of the aforementioned application, including any intervening amendments thereto, is incorporated herein by reference in its entirety.

TECHNICAL FIELD

The present invention relates to the technical field of charging scheduling of electric vehicles, in particular to an electric vehicle charging scheduling method, apparatus and system based on cloud-edge collaboration, a storage medium and an electronic device.

BACKGROUND OF THE PRESENT INVENTION

As a new energy technology to reduce fossil fuel consumption, reduce greenhouse gas emission, and improve air quality, electric vehicles have received extensive attention from governments all over the world. In recent years, the number of electric vehicles has grown rapidly, so that charging management becomes a major challenge. When large-scale electric vehicles are connected to a power grid, the randomness of their charging behaviors will lead to a sharp increase in charging demand during peak hours of the power grid, which will affect the stability and safety of the power grid. A charging process of the electric vehicles can be controlled. Therefore, adopting a reasonable and effective charging coordination strategy to guide orderly charging of the electric vehicles can reduce the load fluctuation of the power grid.

The patent with the application No. 202010859027.1 discloses an electric vehicle charging guidance method and system based on a cloud platform. The technical solution relies on acquisition and processing of electric vehicle information, road network information, charging station information and charging pile information by a cloud server, determines an optimal function of distance from an electric vehicle to charging stations, an optimal function of time, and an optimal function of charging station device utilization equality rate, determines an optimal charging solution using a genetic algorithm according to the optimal function of distance, the optimal function of time and the optimal function of charging station device utilization equality rate, and sends the determined optimal charging solution to a user so that the electric vehicle travels to a recommended charging station for charging according to guidance of the optimal charging solution.

However, the above technical solution has a huge technical defect that charging requests sent by electric vehicles and the massive data generated by the charging process are directly sent to a cloud-based global controller, which greatly increases workload of a cloud and is likely to cause system delay problems.

SUMMARY OF THE PRESENT INVENTION

(I) Technical Problems to be Solved

With respect to shortcomings of the prior art, the present invention provides an electric vehicle charging scheduling method and system based on cloud-edge collaboration, which solves the technical problem that an electric vehicle charging scheduling method greatly increases workload of a cloud and is likely to cause system delay.

(II) Technical Solution

To achieve the above purpose, the present invention is implemented through the following technical solution:

An electric vehicle charging scheduling method based on cloud-edge collaboration is provided, wherein a charging region is divided into a plurality of subintervals and edge computing units are arranged. Each edge computing unit is configured to receive a charging request sent by an electric vehicle in a served subinterval and to apply with a cloud platform for acquiring all charging station information in the charging region. The method includes:

S1, determining a target charging station for a to-be-charged electric vehicle with a minimum traveling cost as a target according to the charging request and charging station information;

S2, after the to-be-charged electric vehicle establishes a charging appointment with the target charging station, uploading electric vehicle charging data in the subinterval served by each edge computing unit to a charging optimization scheduling model pre-trained by the cloud platform, wherein the charging optimization scheduling model is established by the cloud platform based on a current basic load prediction result; and S3, receiving an electric vehicle charging scheduling strategy obtained by the cloud platform which solves the charging optimization scheduling model based on a particle swarm algorithm, and issuing a scheduling instruction to each charging station according to the scheduling strategy, to realize orderly charging of electric vehicles in the entire charging region.

Preferably, the traveling cost in S1 is represented as:

$$\text{cost} = Y'_i \cdot (T^{cs}_{i,j} + W_{i,j} + T^{des}_{i,j}) + \lambda_{i,j} \tag{1}$$

$$T^{cs}_{i,j} = \frac{d^{cs}_{i,j}}{v_i} \tag{2}$$

$$W_{i,j} = U^{cs}_{i,j} - T^{start}_i \tag{3}$$

$$T^{des}_{i,j} = \frac{d^{des}_{i,j}}{v_i} \tag{4}$$

$$d^{cs}_{i,j} \leq \frac{SOC^{start}_i \cdot Bat_i}{\eta_i}, j \in [1, J] \tag{5}$$

where $Y_i$ is an equivalent monetary cost of consuming a unit of time; $T^{cs}_{i,j}$ is a time consumed by an electric vehicle i to reach a charging station j; $v_i$ is an average traveling speed of the electric vehicle i; $W_{i,j}$ is a time the electric vehicle i needs to wait at the charging station j; $T^{start}_i$ is an expected charging start moment of the electric vehicle i; $U^{cs}_{i,j}$ is determined based on a using condition of the charging station j when the electric vehicle i sends the charging request; if a charging pile in an idle state exists at the charging station j when the electric vehicle i sends the charging request, $U^{cs}_{i,j}=T^{start}_i$, or otherwise, $U^{cs}_{i,j}$ equals a time when a nearest charging pile finishes charging; $T^{des}_{i,j}$ is a time consumed by the electric vehicle i departing from the charging station j to reach a destination; and $\lambda_{i,j}$ is a dynamic expense in a driving process. Formula (5) represents that a charging station is used as an option if the initial state of the electric vehicle is sufficient to ensure that the EV reaches it, where $d_{i,j}^{cs}$ is a distance from the electric vehicle i to the charging station j; $SOC_i^{start}$ is an initial battery state of charge (SOC) of the electric vehicle i, i.e. a proportion of the electric quantity to a total capacity; $Bat_i$ is a battery capacity of the electric vehicle i; $\eta_i$ is a driving efficiency of the electric vehicle i; and J is the quantity of charging stations in the region.

Preferably, before uploading the electric vehicle charging data in the subinterval served by each edge computing unit in S2, a private information of a user in the electric vehicle charging data is encrypted.

Preferably, the current basic load prediction result in S2 is acquired by a deep learning model constructed by the cloud platform based on basic load data, environmental data, and date data of a regional power grid in a historical time period.

Preferably, the charging optimization scheduling model in S2 includes:

an objective function aiming at minimizing regional power grid load fluctuation:

$$\min f_{grid} = \sum_{t=1}^{T}\left[\frac{1}{T}\left(P_{grid}^t + \sum_{n=1}^{N}\sum_{k=1}^{K_n} x_{n,k}^t \cdot P_{n,k}^{ev} - P_{avg}\right)^2\right] \quad (6)$$

$$P_{avg} = \frac{\sum_{t=1}^{T}\left(P_{grid}^t + \sum_{n=1}^{N}\sum_{k=1}^{K_n} x_{n,k}^t \cdot P_{n,k}^{ev}\right)}{T} \quad (7)$$

where $P_{grid}^t$ is a basic load of the regional power grid in a time period t predicted by the deep learning model; $P_{n,k}^{ev}$ is charging power of a k th electric vehicle in the subinterval served by a nth edge computing unit, wherein the entire charging region is divided into N served subintervals and a single edge computing unit is arranged in each subinterval; $K_n$ is the quantity of electric vehicles appointed for the charging in the served subinterval served by an edge computing unit n; $x_{n,k}^t$ is a charging state of the electric vehicle in the time period t; if $x_{n,k}^t=1$, the electric vehicle is in a charging state in the time period t, or otherwise, the electric vehicle is in a non-charging state; and $P_{avg}$ represents an average load of the regional power grid in a cycle T.

Preferably, the charging optimization scheduling model in S2 further includes:

a first constraint condition considering regional power grid load constraint:

$$P_{grid}^t + \Sigma_{n=1}^{N}\Sigma_{k=1}^{K_n} x_{n,k}^t \cdot P_{n,k}^{ev} \leq P_{max}^t \quad (8)$$

where $P_{max}^t$ represents maximum power that can be provided by the regional power grid in the time period t;

a second constraint condition considering electric vehicle charging electric quantity constraint:

$$SOC_{n,k}^t = \frac{SOC_{n,k}^{t-1} + x_{n,k}^t \cdot P_{n,k}^{ev} \cdot \Delta t}{Bat_{n,k}}, t \in [1, T], n \in [1, N], k \in [1, K_n] \quad (9)$$

$$SOC_{n,k}^{min} \leq SOC_{n,k}^t \leq SOC_{n,k}^{max} \quad (10)$$

$$SOC_{n,k}^{start} \cdot Bat_{n,k} - d_{n,k}^{cs} \cdot \eta_{n,k} + \sum_{t=T_{n,k}^{start}}^{T_{n,k}^{end}} x_{n,k}^t \cdot P_{n,k}^{ev} \cdot \Delta t \geq E_{n,k}^{ess} \quad (11)$$

where formula (9) represents that the SOC of a battery in the time period t is the SOC in a time period t−1 plus the SOC of the electric vehicle obtained in the time period t; $SOC_{n,k}^t$, $SOC_{n,k}^{t-1}$ respectively represent the SOC of the electric vehicle in the time periods t and t−1; $\Delta t$ represents a duration of a time period; $Bat_{n,k}$ represents a battery capacity of the k th electric vehicle in the interval served by the n th edge computing unit; $SOC_{n,k}^{min}$ and $SOC_{n,k}^{max}$ respectively represent an allowed lower limit and upper limit of the SOC of the kth electric vehicle in the subinterval served by the nth edge computing unit; $SOC_{n,k}^{start}$ represents an initial battery SOC of the kth electric vehicle in the subinterval served by the nth edge computing unit; $d_{n,k}^{cs}$ represents a distance from the kth electric vehicle in the subinterval served by the nth edge computing unit to the target charging station; $\eta_{n,k}$ represents a driving efficiency of the k th electric vehicle in the subinterval served by the n th edge computing unit; $T_{n,k}^{start}$, $T_{n,k}^{end}$ represent a charging start moment and a charging end moment of the k th electric vehicle in the subinterval served by the n th edge computing unit; and $E_{n,k}^{ess}$ represents an expected charging demand of the kth electric vehicle in the subinterval served by the nth edge computing unit.

An electric vehicle charging scheduling apparatus based on cloud-edge collaboration, wherein a charging region is divided into a plurality of subintervals and edge computing units are arranged. Each edge computing unit is configured to receive a charging request sent by an electric vehicle in a served subinterval and to apply to the cloud platform to obtain all charging station information in the charging region. The apparatus includes:

a determining module, configured to determine a target charging station for a to-be-charged electric vehicle with a minimum traveling cost as a target according to the charging request and the charging station information;

an uploading module, configured to upload electric vehicle charging data in the subinterval served by each edge computing unit to a charging optimization scheduling model pre-trained by the cloud platform after the to-be-charged electric vehicle establishes a charging appointment with the target charging station, wherein the charging optimization scheduling model is established by the cloud platform based on a current basic load prediction result; and a scheduling module, configured to receive an electric vehicle charging scheduling strategy obtained by the cloud platform which solves the charging optimization scheduling model based on a particle swarm algorithm, and issue a scheduling instruction to each charging station according to the scheduling strategy, to realize orderly charging of electric vehicles in the entire charging region.

An electric vehicle charging scheduling system based on cloud-edge collaboration includes:

a vehicle-mounted controller, configured to send a charging request and make an appointment for charging;

an edge computing unit, configured to identify target charging stations for electric vehicles and execute the above electric vehicle charging scheduling method; and a cloud platform, configured to receive electric vehicle charging data in the subinterval served by each edge computing unit, and obtain an electric vehicle charging scheduling strategy according to a charging optimization scheduling model established based on a current basic load prediction result.

A storage medium stores a computer program for electric vehicle charging scheduling based on cloud-edge collaboration, wherein the computer program enables a computer to execute the above electric vehicle charging scheduling method.

An electronic device includes:
one or more processors;
a memory; and
one or more programs, wherein the one or more programs are stored on the memory and configured to be executed by the one or more processors, and each program is used for executing the above electric vehicle charging scheduling method.

(III) Beneficial Effects

The present invention provides an electric vehicle charging scheduling method, apparatus and system based on cloud-edge collaboration, a storage medium and an electronic device. Compared with the prior art, the present invention has the following beneficial effects:

In the present invention, a charging request of an electric vehicle user is accepted and processed by an edge computing unit, and a target charging station for a to-be-charged electric vehicle is determined with a minimum traveling cost as a target, so that a data transmission distance is reduced, and the electric vehicle user is timely assisted in selecting the target charging station and completing a charging appointment. After the charging appointment is made, charging data is uploaded to a charging optimization scheduling model pre-trained by a cloud platform for obtaining an electric vehicle charging scheduling strategy, so that powerful computing abilities of the cloud platform and advantages of rapid response of the edge computing unit are fully utilized, the problem of network congestion is avoided, and timeliness is improved.

BRIEF DESCRIPTION OF THE DRAWINGS

To more clearly describe the technical solutions in the embodiments of the present invention or in prior art, the drawings required to be used in the description of the embodiments or the prior art will be simply presented below. Apparently, the drawings in the following description are merely some embodiments of the present invention, and for those skilled in the art, other drawings can also be obtained according to these drawings without contributing creative labor.

FIG. 1 is a flow chart of an electric vehicle charging scheduling method based on cloud-edge collaboration provided by an embodiment of the present invention;

DETAILED DESCRIPTION OF THE PRESENT INVENTION

To make purposes, technical solutions and advantages of embodiments of the present invention clearer, the technical solutions in the embodiments of the present invention will be clearly and fully described. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiments of the present application provide an electric vehicle charging scheduling method, apparatus and system based on cloud-edge collaboration, a storage medium and an electronic device, solve the technical problems that an electric vehicle charging scheduling technology greatly increases workload of a cloud and is likely to cause system delay, avoids occurrence of network congestion problems and improves timeliness.

In order to solve the technical problems, an overall thought of the technical solutions in the embodiments of the present application is as follows:

In the embodiments of the present invention, a charging request of an electric vehicle user is accepted and processed by an edge computing unit, and a target charging station for a to-be-charged electric vehicle is determined with a minimum traveling cost as a target, so that a data transmission distance is reduced, and the electric vehicle user is timely assisted in selecting the target charging station and completing a charging appointment. After the charging appointment is made, charging data is uploaded to a charging optimization scheduling model pre-trained by a cloud platform for obtaining an electric vehicle charging scheduling strategy, so that powerful computing abilities of the cloud platform and advantages of rapid response of the edge computing unit are fully utilized, the problems of network congestion are avoided, and timeliness is improved.

For better understanding of the technical solutions, the technical solutions will be described in detailed in combination with the accompanying drawings and specific implementations.

Embodiment

Figure 2:
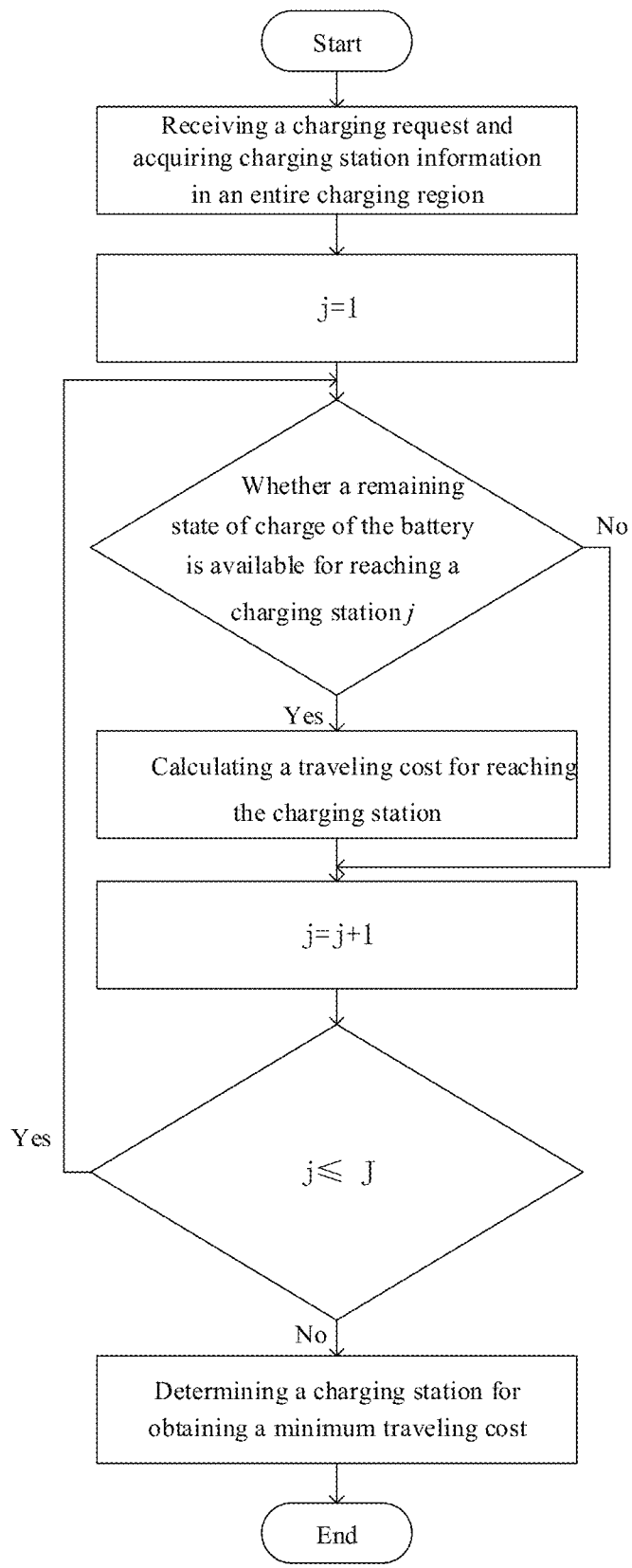
FIG. 2 is a flow chart of determining a target charging station for a to-be-charged electric vehicle provided by an embodiment of the present invention.

As shown in FIG. 1 and FIG. 2, an embodiment of the present invention provides an electric vehicle charging scheduling method based on cloud-edge collaboration.

A charging region is first divided into a plurality of subintervals and edge computing units are arranged. Each edge computing unit is configured to receive a charging request sent by an electric vehicle in a served subinterval and to apply to the cloud platform to obtain all charging station information in the charging region. The method includes:

S1, a target charging station for a to-be-charged electric vehicle is determined with a minimum traveling cost as a target according to the charging request and the charging station information;

S2, after the to-be-charged electric vehicle establishes a charging appointment with the target charging station, electric vehicle charging data in the subinterval served by each edge computing unit is uploaded to a charging optimization scheduling model pre-trained by the cloud platform, wherein the charging optimization scheduling model is established by the cloud platform based on a current basic load prediction result; and S3, an electric vehicle charging scheduling strategy obtained by the cloud platform which solves the charging optimization scheduling model based on a particle swarm algorithm is received, and a scheduling instruction is issued to each charging station according to the scheduling strategy, to realize orderly charging of electric vehicles in the entire charging region.

In the embodiment of the present invention, the charging request of an electric vehicle user is accepted and processed by an edge computing unit, and the target charging station for the to-be-charged electric vehicle is determined with a minimum traveling cost as a target, so that a data transmission distance is reduced, and the electric vehicle user is timely assisted in selecting the target charging station and completing a charging appointment. After the charging appointment is made, charging data is uploaded to the charging optimization scheduling model pre-trained by the cloud platform for obtaining the electric vehicle charging scheduling strategy, so that powerful computing abilities of the cloud platform and advantages of rapid response of the edge computing unit are fully utilized, the problem of network congestion is avoided, and timeliness is improved.

Each step of the above technical solution will be introduced in combination with specific content:

It should be noted that, the embodiment of the present invention first divides the charging region into N subintervals, and one edge computing unit is arranged correspondingly in each subinterval. The edge computing unit in each subinterval serves electric vehicles in the subinterval, guides the electric vehicles to select a proper charging station for charging, and feedbacks electric vehicle information, i.e. electric vehicle charging data to the cloud platform after processing. From the perspective of a regional power grid, the electric vehicle charging scheduling strategy is determined based on the charging data sent by the edge computing unit corresponding to each subinterval to reduce load fluctuation of the regional power grid.

S1, the target charging station for the to-be-charged electric vehicle is determined with a minimum traveling cost as a target according to the charging request and the charging station information.

The charging request is sent by the electric vehicle, and in particular, a vehicle-mounted control system of the electric vehicle sends the charging request, including electric vehicle information $EV_{profile}$.

$$EV_{profile}=[EV_{ID},EV_{address},Des_{address},T_{start},T_{end},Bat_{type},SOC_{start},E_{ess}] \quad (1)$$

where $EV_{ID}$ is a unique marker of the electric vehicle; $EV_{address}$ is an initial geographical location of the electric vehicle; $Des_{address}$ is a geographical location of a destination of the electric vehicle; $T_{start}$ is a charging start moment of the electric vehicle; $T_{end}$ is a charging end moment of the electric vehicle; $Bat_{type}$ is a battery type of the electric vehicle; $SOC_{start}$ is an initial battery SOC of the electric vehicle; and $E_{ess}$ is an expected charging demand of the electric vehicle. It should be emphasized that time parameters involved in the electric vehicle information in the charging request are all estimated time when the electric vehicle sends the charging request.

As shown in FIG. 2, a nearest edge computing unit receives the charging request, applies to the cloud platform to obtain all charging station information in the charging region, determines the target charging station for the to-be-charged electric vehicle with a minimum traveling cost as a target, and makes the charging appointment.

The traveling cost is represented as:

$$cost = Y'_i \cdot (T_{i,j}^{cs} + W_{i,j} + T_{i,j}^{des}) + \lambda_{i,j} \quad (2)$$

$$T_{i,j}^{cs} = \frac{d_{i,j}^{cs}}{v_i} \quad (3)$$

$$W_{i,j} = U_{i,j}^{cs} - T_i^{start} \quad (4)$$

$$T_{i,j}^{des} = \frac{d_{i,j}^{des}}{v_i} \quad (5)$$

$$d_{i,j}^{cs} \leq \frac{SOC_i^{start} \cdot Bat_i}{\eta_i}, j \in [1, J] \quad (6)$$

where $Y_i$ is an equivalent monetary cost of consuming a unit of time; $T_{i,j}^{cs}$ is a time consumed by the electric vehicle i to reach a charging station j; $v_i$ is an average traveling speed of the electric vehicle i; $W_{i,j}$ is a time the electric vehicle i needs to wait at the charging station j; $T_i^{start}$ is an expected charging start moment of the electric vehicle i (i.e. a charging start moment in the charging request sent by the electric vehicle i); $U_{i,j}^{cs}$ is determined based on a using condition of the charging station j when the electric vehicle i sends the charging request; if a charging pile in an idle state exists at the charging station j when the electric vehicle i sends the charging request, $U_{i,j}^{cs}=T_i^{start}$, or otherwise, $U_{i,j}^{cs}$ equals a time when a nearest charging pile finishes charging; $T_{i,j}^{des}$ is a time consumed by the electric vehicle i departing from the charging station j to reach the destination; and $\lambda_{i,j}$ is a dynamic expense in a driving process. Formula (6) represents that a charging station is used as an option if the initial state of the electric vehicle is sufficient to ensure that the electric vehicle reaches it, where $d_{i,j}^{cs}$ is a distance from the electric vehicle i to the charging station j; $SOC_i^{start}$ is an initial battery SOC of the electric vehicle i, i.e. a proportion of the electric quantity to a total capacity; $Bat_i$ is a battery capacity of the electric vehicle i; $\eta_i$ is a driving efficiency of the electric vehicle i; and J is the quantity of charging stations in the region.

It is not difficult to see that an electric vehicle traveling cost function takes into account a traveling time of the electric vehicle heading for the charging station, a waiting time at the charging station, and a time from the charging station to the destination, which not only reduces time cost of the electric vehicle user, but also reduces congestion of the charging station.

S2, after the to-be-charged electric vehicle establishes the charging appointment with the target charging station, the electric vehicle charging data in the subinterval served by each edge computing unit is uploaded to the charging optimization scheduling model pre-trained by the cloud platform, wherein the charging optimization scheduling model is established by the cloud platform based on the current basic load prediction result.

To take an edge unit $ECU_n$ as an example, the quantity of electric vehicles sending a charging request is $K_n$. A time period when the electric vehicle k starts charging is $T_{n,k}^{start}$ (charging start time determined after considering a time when the electric vehicle needs to wait at the charging station); a time period of ending charging is $T_{n,k}^{end}$; an expected charging demand is $E_{n,k}^{ess}$; a battery capacity is $Bat_{n,k}$; an initial battery SOC is $SOC_{n,k}^{start}$; and a lower limit and an upper limit of a battery SOC are $SOC_{n,k}^{min}$ and $SOC_{n,k}^{max}$.

Apparently, the charging data collected by the cloud platform is an integration of information uploaded by all edge computing units, and the entire charging region is divided into the N subintervals. The electric vehicle charging data gathered by the cloud platform is represented as:

$$S^{center} = [ECU_1, \ldots, ECU_n, \ldots, ECU_N]^T \quad (7)$$

-continued $$ECU_n = \begin{bmatrix} T_{n,1}^{start} & T_{n,1}^{end} & E_{n,1}^{ess} & Bat_{n,1} & SOC_{n,1}^{start} & SOC_{n,1}^{min} & SOC_{n,1}^{max} \\ \vdots & \vdots & \vdots & \vdots & \vdots & \vdots & \vdots \\ T_{n,k}^{start} & T_{n,k}^{end} & E_{n,k}^{ess} & Bat_{n,k} & SOC_{n,k}^{start} & SOC_{n,k}^{min} & SOC_{n,k}^{max} \\ \vdots & \vdots & \vdots & \vdots & \vdots & \vdots & \vdots \\ T_{n,K_n}^{start} & T_{n,K_n}^{end} & E_{n,K_n}^{ess} & Bat_{n,K_n} & SOC_{n,K_n}^{start} & SOC_{n,K_n}^{min} & SOC_{n,K_n}^{max} \end{bmatrix} \quad (8)$$

Reliable power load prediction provides a basis for the regional power grid to implement electric vehicle charging scheduling, and deep learning has powerful functions in the field of load prediction. Therefore, the current basic load prediction result in S2 is obtained by the deep learning model constructed by the cloud platform based on basic load data, environmental data, and date data of the regional power grid in a historical time period.

In particular, the basic load data, environmental data, and date data of the regional power grid in a preset historical time period are collected, and the collected data is divided into a training set and a test set. Assuming that the cloud platform collects data every 15 minutes, a total of 96 pieces of data are collected in one day. A network structure and model parameters of the deep learning model are set. The training set is input into the deep learning model for deep learning to obtain a prediction model.

The test set is input into the prediction model to obtain the prediction result, and a root mean square error and an average absolute percentage error are used to evaluate the prediction result. If a prediction error is lower than a predetermined error requirement, the current deep learning model is used to predict basic load of the regional power grid; or otherwise, parameters of the current deep learning model are optimized.

Uncertainty of the grid-side basic load (load of the regional grid that does not include electric vehicle charging load) will affect the effectiveness of an electric vehicle scheduling scheme.

Therefore, the charging optimization scheduling model includes:

an objective function aiming at minimizing regional power grid load fluctuation:

$$\min f_{grid} = \sum_{t=1}^{T} \left[ \frac{1}{T} \left( P_{grid}^t + \sum_{n=1}^{N} \sum_{k=1}^{K_n} x_{n,k}^t \cdot P_{n,k}^{ev} - P_{avg} \right)^2 \right] \quad (9)$$

$$P_{avg} = \frac{\sum_{t=1}^{T} \left( P_{grid}^t + \sum_{n=1}^{N} \sum_{k=1}^{K_n} x_{n,k}^t \cdot P_{n,k}^{ev} \right)}{T} \quad (10)$$

where $P_{grid}^t$ is a basic load of the regional power grid in a time period t predicted by the deep learning model; $P_{n,k}^{ev}$ is charging power of a k th electric vehicle in the subinterval served by a nth edge computing unit, wherein the entire charging region is divided into N served subintervals and a single edge computing unit is arranged in each subinterval; $K_n$ is the quantity of electric vehicles appointed for the charging in the served subinterval served by an edge computing unit n; $x_{n,k}^t$ is a charging state of the electric vehicle in the time period t; if $x_{n,k}^t=1$, the electric vehicle is in a charging state in the time period t, or otherwise, the electric vehicle is in a non-charging state; and $P_{avg}$ represents an average load of the regional power grid in a cycle T.

The charging optimization scheduling model further includes:

a first constraint condition considering regional power grid load constraint:

$$P_{grid}^t + \Sigma_{n=1}^{N} \Sigma_{k=1}^{K_n} x_{n,k}^t \cdot P_{n,k}^{ev} \leq P_{max}^t \quad (11)$$

where $P_{max}^t$ represents maximum power that can be provided by the regional power grid in the time period t;

a second constraint condition considering the SOC constraint of an electric vehicle:

$$SOC_{n,k}^t = \frac{SOC_{n,k}^{t-1} + x_{n,k}^t \cdot P_{n,k}^{ev} \cdot \Delta t}{Bat_{n,k}}, t \in [1, T], n \in [1, N], k \in [1, K_n] \quad (12)$$

$$SOC_{n,k}^{min} \leq SOC_{n,k}^t \leq SOC_{n,k}^{max} \quad (13)$$

$$SOC_{n,k}^{start} \cdot Bat_{n,k} - d_{n,k}^{cs} \cdot \eta_{n,k} + \sum_{t=T_{n,k}^{start}}^{T_{n,k}^{end}} x_{n,k}^t \cdot P_{n,k}^{ev} \cdot \Delta t \geq E_{n,k}^{ess} \quad (14)$$

where formula (12) represents that a SOC of the battery in the time period t is the SOC in a time period t−1 plus an electric quantity obtained in the time period t; $SOC_{n,k}^t$, $SOC_{n,k}^{t-1}$ respectively represent the SOC of the electric vehicle in the time periods t and t−1; Δt represents a duration of a time period; $Bat_{n,k}$ represents a battery capacity of the kth electric vehicle in the subinterval served by the nth edge computing unit; $SOC_{n,k}^{min}$ and $SOC_{n,k}^{max}$ respectively represent an allowed lower limit and upper limit of the SOC of the kth electric vehicle in the subinterval served by the nth edge computing unit; $SOC_{n,k}^{start}$ represents an initial battery SOC of the k th electric vehicle in the subinterval served by the n th edge computing unit; $d_{n,k}^{cs}$ represents a distance from the kth electric vehicle in the subinterval served by the nth edge computing unit to the target charging station; $\eta_{n,k}$ represents a driving efficiency of the k th electric vehicle in the subinterval served by the n th edge computing unit; $T_{n,k}^{start}$, $T_{n,k}^{end}$ represent a charging start moment and a charging end moment of the k th electric vehicle in the subinterval served by the n th edge computing unit; and $E_{n,k}^{ess}$ represents an expected charging demand of the kth electric vehicle in the subinterval served by the nth edge computing unit.

Particularly, before uploading the electric vehicle charging data in the subinterval served by each edge computing unit in S2, the private information of a user in the electric vehicle charging data is further encrypted, which can protect safety of the private information of the electric vehicle user and mitigate the threat of cyber attackers.

S3, the electric vehicle charging scheduling strategy obtained by the cloud platform which solves the charging optimization scheduling model based on the particle swarm algorithm is received, and the scheduling instruction is issued to each charging station according to the scheduling strategy, to realize orderly charging of the electric vehicles in the entire charging region.

In the step, the cloud platform adopts the particle swarm algorithm for solving the charging optimization scheduling model to obtain the electric vehicle charging scheduling strategy, which determines a charging state and a charging end moment of the electric vehicle in the charging process, and issues them to all edge computing units.

If the target charging station of the electric vehicle is not within a service range of an edge computing unit where the electric vehicle is located, the edge computing unit where the electric vehicle is located will send the charging scheduling strategy and electric vehicle information about the electric vehicle sent by the cloud platform to an edge computing unit where the target charging station is located.

Finally, the edge computing unit sends the scheduling instruction to each charging station according to a scheduling strategy to realize orderly charging of electric vehicles.

Figure 3:
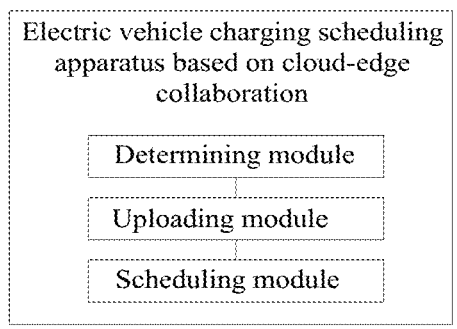
FIG. 3 is a structural block diagram of an electric vehicle charging scheduling apparatus based on cloud-edge collaboration provided by an embodiment of the present invention.
Figure 4:
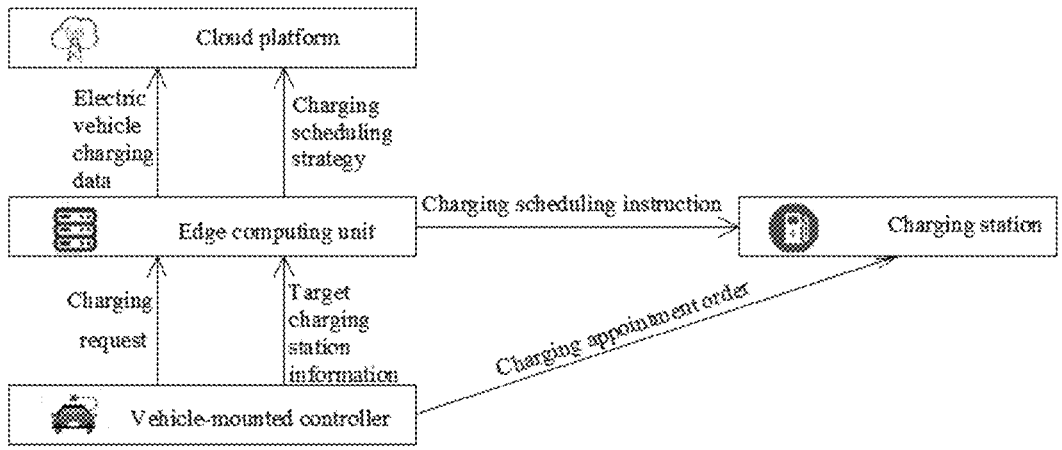
FIG. 4 is a structural block diagram of an electric vehicle charging scheduling structure based on cloud-edge collaboration provided by an embodiment of the present invention.

In a second aspect, as shown in FIG. 3, an embodiment of the present invention provides an electric vehicle charging scheduling apparatus based on cloud-edge collaboration.

A charging region is first divided into a plurality of subintervals and edge computing units are arranged. Each edge computing unit is configured to receive a charging request sent by an electric vehicle in a served subinterval and to apply to the cloud platform to obtain all charging station information in the charging region. The apparatus includes:

- a determining module, configured to determine a target charging station for a to-be-charged electric vehicle with a minimum traveling cost as a target according to the charging request and the charging station information;
- an uploading module, configured to upload electric vehicle charging data in the subinterval served by each edge computing unit to a charging optimization scheduling model pre-trained by the cloud platform after the to-be-charged electric vehicle establishes a charging appointment with the target charging station, wherein the charging optimization scheduling model is established by the cloud platform based on a current basic load prediction result; and
- a scheduling module, configured to receive an electric vehicle charging scheduling strategy obtained by the cloud platform which solves the charging optimization scheduling model based on a particle swarm algorithm, and issue a scheduling instruction to each charging station according to the scheduling strategy, to realize orderly charging of electric vehicles in the entire charging region.

In a third aspect, an embodiment of the present invention provides an electric vehicle charging scheduling system based on cloud-edge collaboration, including:

- a vehicle-mounted controller, configured to send a charging request and make an appointment for charging;
- an edge computing unit, configured to identify target charging stations for electric vehicles and execute the above electric vehicle charging scheduling method; and
- a cloud platform, configured to receive electric vehicle charging data in the subinterval served by each edge computing unit, and obtain an electric vehicle charging scheduling strategy according to a charging optimization scheduling model established based on a current basic load prediction result.

In a fourth aspect, an embodiment of the present invention provides a storage medium, which stores a computer program for electric vehicle charging scheduling based on cloud-edge collaboration, wherein the computer program enables a computer to execute the above electric vehicle charging scheduling method.

In a fifth aspect, an embodiment of the present invention provides an electronic device, including:

- one or more processors;
- a memory; and
- one or more programs, wherein the one or more programs are stored on the memory and configured to be executed by the one or more processors, and each program is used for executing the above electric vehicle charging scheduling method.

It is understandable that the electric vehicle charging scheduling apparatus and system based on cloud edge collaboration, the storage medium, and the electronic device provided in the embodiments of the present invention correspond to the electric vehicle charging scheduling method based on cloud edge collaboration provided by the embodiments of the present invention. For explanations, examples, and beneficial effects of relevant content thereof, reference may be made to corresponding parts in the electric vehicle charging scheduling method based on cloud edge collaboration, which will not be repeated here.

In conclusion, compared with the prior art, the present invention has the following beneficial effects:

1. In the embodiments of the present invention, a charging request of an electric vehicle user is accepted and processed by an edge computing unit, and a target charging station for a to-be-charged electric vehicle is determined with a minimum traveling cost as a target, so that a data transmission distance is reduced, and the electric vehicle user is timely assisted in selecting the target charging station and completing a charging appointment. After the charging appointment is made, charging data is uploaded to a charging optimization scheduling model pre-trained by a cloud platform for obtaining an electric vehicle charging scheduling strategy, so that powerful computing abilities of the cloud platform and advantages of rapid response of the edge computing unit are fully utilized, the problem of network congestion is avoided, and timeliness is improved.

2. In the embodiments of the present invention, an electric vehicle traveling cost function takes into account a traveling time of the electric vehicle heading for the charging station, a waiting time at the charging station, and a time from the charging station to the destination, which not only reduces time cost of the electric vehicle user, but also reduces congestion of the charging station.

3. According to the charging optimization scheduling model in the embodiments of the present invention, uncertainty of the grid-side basic load (load of the regional grid that does not include electric vehicle charging load) is considered, which can provide a basis for implementation of charging scheduling on the cloud platform so as to achieve a purpose of effectively reducing load fluctuation of the regional grid.

It should be noted that relationship terms of first, second and the like herein are just used for differentiating one entity or operation from the other entity or operation, and do not necessarily require or imply any practical relationship or sequence between the entities or operations. Moreover, terms of "comprise", "include" or any other variant are intended to cover non-exclusive inclusion, so that a process, a method, an article or a device which includes a series of elements not only includes such elements, but also includes other elements not listed clearly or also includes inherent elements in the process, the method, the article or the device. Under the condition of no more limitation, the elements defined by a sentence "include one . . . " do not exclude additional identical elements in the process, the method, the article or the terminal device which includes the elements.

The above embodiments are only used for describing the technical solution of the present invention rather than limiting the same. Although the present invention is described in detail by referring to the above embodiments, those ordinary skilled in the art should understand that the technical solution recorded in each of the above embodiments can be still amended, or some technical features therein can be replaced equivalently. However, these amendments or replacements do not enable the essence of the corresponding technical solutions to depart from the spirit and the scope of the technical solutions of various embodiments of the present invention.

What is claimed is:

1. An electric vehicle charging scheduling method based on cloud-edge collaboration, wherein a charging region is divided into a plurality of subintervals and edge computing units are arranged; each edge computing unit is configured to receive a charging request sent by an electric vehicle in a served subinterval and to apply to a cloud platform for acquiring all charging station information in the charging region; the method comprises:

S1, determining a target charging station for a to-be-charged electric vehicle with a minimum traveling cost as a target according to the charging request and charging station information;

S2, after the to-be-charged electric vehicle establishes a charging appointment with the target charging station, uploading electric vehicle charging data in the subinterval served by each edge computing unit to a charging optimization scheduling model pre-trained by the cloud platform, wherein the charging optimization scheduling model is established by the cloud platform based on a current basic load prediction result; and S3, receiving an electric vehicle charging scheduling strategy obtained by the cloud platform which solves the charging optimization scheduling model based on a particle swarm algorithm, and issuing a scheduling instruction to each charging station according to the scheduling strategy, to realize orderly charging of electric vehicles in the entire charging region.

2. The electric vehicle charging scheduling method according to claim 1, wherein the traveling cost in S1 is represented as:

$$\text{cost} = Y'_i \cdot (T^{cs}_{i,j} + W_{i,j} + T^{des}_{i,j}) + \lambda_{i,j} \quad (1)$$

$$T^{cs}_{i,j} = \frac{d^{cs}_{i,j}}{v_i} \quad (2)$$

$$W_{i,j} = U^{cs}_{i,j} - T^{start}_i \quad (3)$$

$$T^{des}_{i,j} = \frac{d^{des}_{i,j}}{v_i} \quad (4)$$

$$d^{cs}_{i,j} \leq \frac{SOC^{start}_i \cdot Bat_i}{\eta_i}, j \in [1, J] \quad (5)$$

where $Y_i$ is an equivalent monetary cost of consuming a unit of time; $T^{cs}_{i,j}$ is a time consumed by an electric vehicle i to reach a charging station j; $v_i$ is an average traveling speed of the electric vehicle i; $W_{i,j}$ is a time the electric vehicle i needs to wait at the charging station j; $T^{start}_i$ is an expected charging start moment of the electric vehicle i; $U^{cs}_{i,j}$ is determined based on a using condition of the charging station j when the electric vehicle i sends the charging request; if a charging pile in an idle state exists at the charging station j when the electric vehicle i sends the charging request, $U^{cs}_{i,j}=T^{start}_i$, or otherwise, $U^{cs}_{i,j}$ equals a time when a nearest charging pile finishes charging; $T^{des}_{i,j}$ is a time consumed by the electric vehicle i departing from the charging station j to reach a destination; and $\lambda_{i,j}$ is a dynamic expense in a driving process; formula (5) represents that a charging station is used as an option if the initial state of the electric vehicle is sufficient to ensure that the electric vehicle reaches it, where $d^{cs}_{i,j}$ is a distance from the electric vehicle i to the charging station j; $SOC^{start}_i$ is an initial battery SOC of the electric vehicle i, i.e. a proportion of the electric quantity to a total capacity; $Bat_i$ is a battery capacity of the electric vehicle i; $\eta_i$ is a driving efficiency of the electric vehicle i; and J is the quantity of charging stations in the region.

3. The electric vehicle charging scheduling method according to claim 1, wherein before uploading the electric vehicle charging data in the subinterval served by each edge computing unit in S2, a private information of a user in the electric vehicle charging data is encrypted.

4. The electric vehicle charging scheduling method according to claim 1, wherein the current basic load prediction result in S2 is acquired by a deep learning model constructed by the cloud platform based on basic load data, environmental data, and date data of a regional power grid in a historical time period.

5. The electric vehicle charging scheduling method according to claim 4, wherein the charging optimization scheduling model in S2 comprises:

an objective function aiming at minimizing regional power grid load fluctuation:

$$\min f_{grid} = \sum_{t=1}^{T} \left[ \frac{1}{T} \left( P^t_{grid} + \sum_{n=1}^{N} \sum_{k=1}^{K_n} x^t_{n,k} \cdot P^{ev}_{n,k} - P_{avg} \right)^2 \right] \quad (6)$$

$$P_{avg} = \frac{\sum_{t=1}^{T} \left( P^t_{grid} + \sum_{n=1}^{N} \sum_{k=1}^{K_n} x^t_{n,k} \cdot P^{ev}_{n,k} \right)}{T} \quad (7)$$

where $P^t_{grid}$ is a basic load of the regional power grid in a time period t predicted by the deep learning model; $P^{ev}_{n,k}$ is charging power of a kth electric vehicle in the subinterval served by a nth edge computing unit; the entire charging region is divided into N served subintervals and a single edge computing unit is arranged in each subinterval; $K_n$ is the quantity of electric vehicles appointed for the charging in the served subinterval served by an edge computing unit n; $x^t_{n,k}$ is a charging state of the electric vehicle in the time period t; if $x^t_{n,k}=1$, the electric vehicle is in a charging state in the time period t, or otherwise, the electric vehicle is in a non-charging state; and $P_{avg}$ represents an average load of the regional power grid in a cycle T.

6. The electric vehicle charging scheduling method according to claim 5, wherein the charging optimization scheduling model in S2 further comprises:

a first constraint condition considering regional power grid load constraint:

$$P^t_{grid} + \sum_{n=1}^{N} \sum_{k=1}^{K_n} x^t_{n,k} \cdot P^{ev}_{n,k} \leq P^t_{max} \quad (8)$$

where $P^t_{max}$ represents maximum power that can be provided by the regional power grid in the time period t;

a second constraint condition considering electric vehicle charging electric quantity constraint:

$$SOC^t_{n,k} = \frac{SOC^{t-1}_{n,k} + x^t_{n,k} \cdot P^{ev}_{n,k} \cdot \Delta t}{Bat_{n,k}}, t \in [1, T], n \in [1, N], k \in [1, K_n] \quad (9)$$

$$SOC^{min}_{n,k} \leq SOC^t_{n,k} \leq SOC^{max}_{n,k} \quad (10)$$

$$SOC^{start}_{n,k} \cdot Bat_{n,k} - d^{cs}_{n,k} \cdot \eta_{n,k} + \sum_{t=T^{start}_{n,k}}^{T^{end}_{n,k}} x^t_{n,k} \cdot P^{ev}_{n,k} \cdot \Delta t \geq E^{ess}_{n,k} \quad (11)$$

where formula (9) represents that the SOC of a battery in the time period t is the SOC in a time period t−1 plus an electric quantity obtained in the time period t; $SOC_{n,k}^{t}$, $SOC_{n,k}^{t-1}$ respectively represent the SOC of the electric vehicle in the time periods t and t−1; $\Delta t$ represents a duration of a time period; $Bat_{n,k}$ represents a battery capacity of the kth electric vehicle in the interval served by the nth edge computing unit; $SOC_{n,k}^{min}$ and $SOC_{n,k}^{max}$ respectively represent an allowed lower limit and upper limit of the SOC of the kth electric vehicle in the subinterval served by the nth edge computing unit; $SOC_{n,k}^{start}$ represents an initial battery SOC of the kth electric vehicle in the subinterval served by the nth edge computing unit; $d_{n,k}^{cs}$ represents a distance from the kth electric vehicle in the subinterval served by the nth edge computing unit to the target charging station; $\eta_{n,k}$ represents a driving efficiency of the kth electric vehicle in the subinterval served by the nth edge computing unit; $T_{n,k}^{start}$, $T_{n,k}^{end}$ represent a charging start moment and a charging end moment of the kth electric vehicle in the subinterval served by the nth edge computing unit; and $E_{n,k}^{ess}$ represents an expected charging demand of the kth electric vehicle in the subinterval served by the nth edge computing unit.

7. An electric vehicle charging scheduling apparatus based on cloud-edge collaboration, wherein a charging region is divided into a plurality of subintervals and edge computers are arranged; each edge computer is configured to receive a charging request sent by an electric vehicle in a served subinterval and to apply to a cloud platform to obtain all charging station information in the charging region; the apparatus comprises a processor which:
  determines a target charging station for a to-be-charged electric vehicle with a minimum traveling cost as a target according to the charging request and the charging station information;
  uploads electric vehicle charging data in the subinterval served by each edge computer to a charging optimization scheduling model pre-trained by the cloud platform after the to-be-charged electric vehicle establishes a charging appointment with the target charging station, wherein the charging optimization scheduling model is established by the cloud platform based on a current basic load prediction result; and
  receives an electric vehicle charging scheduling strategy obtained by the cloud platform which solves the charging optimization scheduling model based on a particle swarm algorithm, and issue a scheduling instruction to each charging station according to the scheduling strategy, to realize orderly charging of electric vehicles in the entire charging region.

8. An electric vehicle charging scheduling system based on cloud-edge collaboration, comprising:
  a vehicle-mounted controller, configured to send a charging request and make an appointment for charging;
  an edge computer, configured to identify target charging stations for electric vehicles and execute the electric vehicle charging scheduling method of claim 1; and
  a cloud platform, configured to receive electric vehicle charging data in the subinterval served by each edge computer, and obtain an electric vehicle charging scheduling strategy according to a charging optimization scheduling model established based on a current basic load prediction result.

9. A non-transitory storage medium, which stores a computer program for electric vehicle charging scheduling based on cloud-edge collaboration, wherein the computer program enables a computer to execute the electric vehicle charging scheduling method of claim 1.

10. A non-transitory storage medium, which stores a computer program for electric vehicle charging scheduling based on cloud-edge collaboration, wherein the computer program enables a computer to execute the electric vehicle charging scheduling method of claim 2.

11. A non-transitory storage medium, which stores a computer program for electric vehicle charging scheduling based on cloud-edge collaboration, wherein the computer program enables a computer to execute the electric vehicle charging scheduling method of claim 3.

12. A non-transitory storage medium, which stores a computer program for electric vehicle charging scheduling based on cloud-edge collaboration, wherein the computer program enables a computer to execute the electric vehicle charging scheduling method of claim 4.

13. A non-transitory storage medium, which stores a computer program for electric vehicle charging scheduling based on cloud-edge collaboration, wherein the computer program enables a computer to execute the electric vehicle charging scheduling method of claim 5.

14. A non-transitory storage medium, which stores a computer program for electric vehicle charging scheduling based on cloud-edge collaboration, wherein the computer program enables a computer to execute the electric vehicle charging scheduling method of claim 6.

15. An electronic device, comprising:
  one or more processors;
  a memory; and
  one or more programs, wherein the one or more programs are stored in the memory and configured to be executed by the one or more processors, and each program is used for executing the electric vehicle charging scheduling method of claim 1.

16. An electronic device, comprising:
  one or more processors;
  a memory; and
  one or more programs, wherein the one or more programs are stored in the memory and configured to be executed by the one or more processors, and each program is used for executing the electric vehicle charging scheduling method of claim 2.

17. An electronic device, comprising:
  one or more processors;
  a memory; and
  one or more programs, wherein the one or more programs are stored in the memory and configured to be executed by the one or more processors, and each program is used for executing the electric vehicle charging scheduling method of claim 3.

18. An electronic device, comprising:
  one or more processors;
  a memory; and
  one or more programs, wherein the one or more programs are stored in the memory and configured to be executed by the one or more processors, and each program is used for executing the electric vehicle charging scheduling method of claim 4.

19. An electronic device, comprising:
  one or more processors;
  a memory; and
  one or more programs, wherein the one or more programs are stored in the memory and configured to be executed by the one or more processors, and each program is used for executing the electric vehicle charging scheduling method of claim 5.

20. An electronic device, comprising:
one or more processors;
a memory; and
one or more programs, wherein the one or more programs are stored in the memory and configured to be executed by the one or more processors, and each program is used for executing the electric vehicle charging scheduling method of claim 6.

* * * * *